Figure 1:
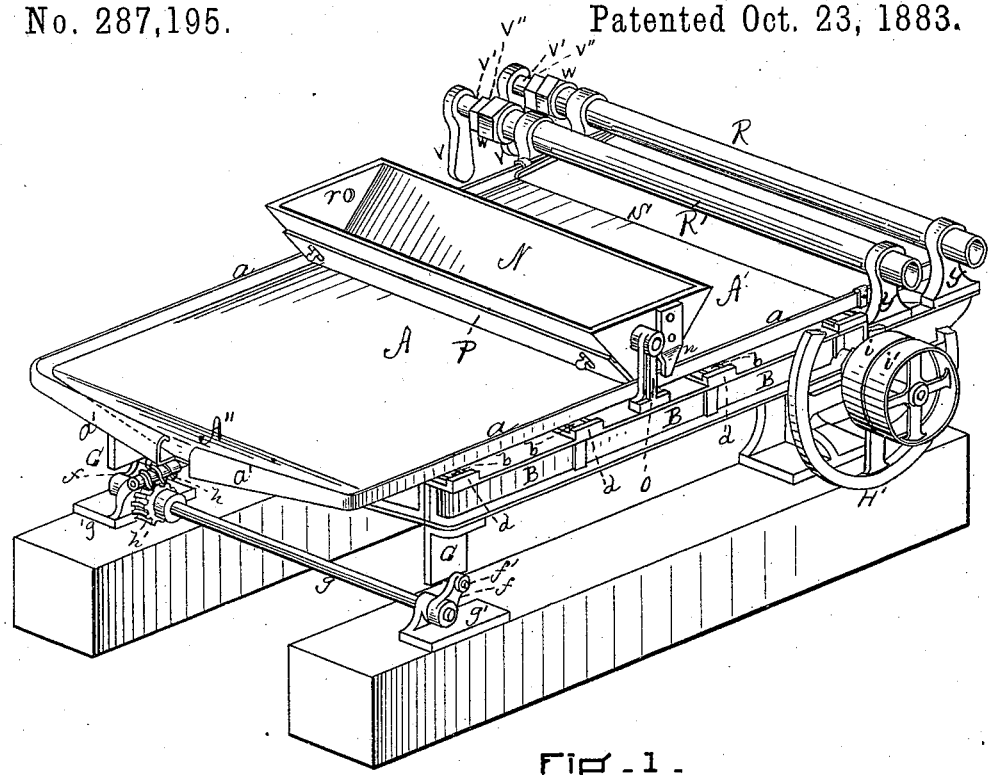

(No Model.) 3 Sheets—Sheet 1.

H. P. TOBEY & G. B. THAYER.
ORE SEPARATOR AND AMALGAMATOR.

No. 287,195. Patented Oct. 23, 1883.

WITNESSES
B. W. Williams
Irving H. Baker

INVENTORS
Horace P. Tobey
George B. Thayer
by their atty.
Henry W. Williams (No Model.) 3 Sheets—Sheet 2.

H. P. TOBEY & G. B. THAYER.
ORE SEPARATOR AND AMALGAMATOR.

No. 287,195. Patented Oct. 23, 1883.

WITNESSES
B. W. Williams
Irving H. Baker.

INVENTORS
Horace P. Tobey
George B. Thayer
by their atty.
Henry W. Williams (No Model.) 3 Sheets—Sheet 3.
H. P. TOBEY & G. B. THAYER.
ORE SEPARATOR AND AMALGAMATOR.
No. 287,195. Patented Oct. 23, 1883.
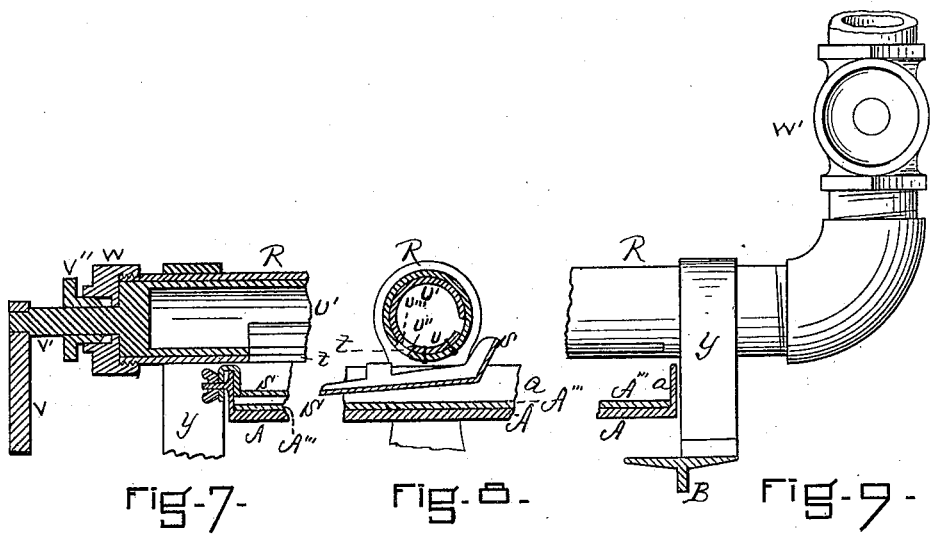
Fig. 7. Fig. 8. Fig. 9.
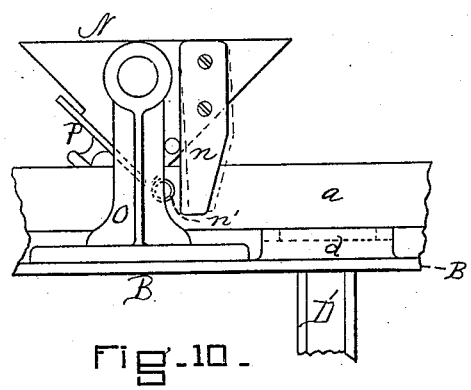
Fig. 10.
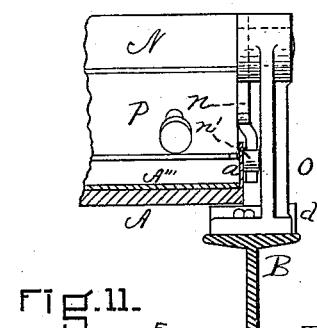
Fig. 11.
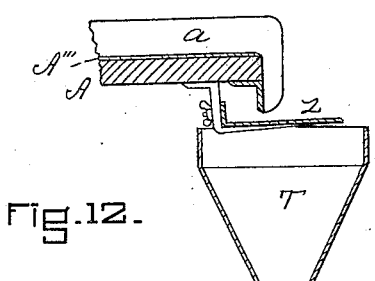
Fig. 12.
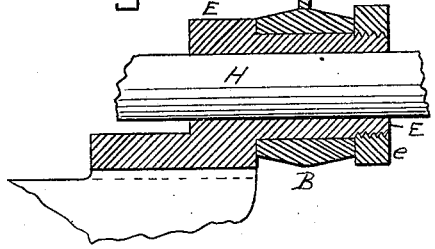
WITNESSES
B. W. Williams.
Irving H. Baker.
INVENTORS
Horace P. Tobey
George B. Thayer
by their atty,
Henry W. Williams

UNITED STATES PATENT OFFICE.

HORACE P. TOBEY, OF WAREHAM, AND GEORGE B. THAYER, OF BOSTON, MASSACHUSETTS, ASSIGNORS TO THE GOLDEN GATE CONCENTRATOR COMPANY, OF AUGUSTA, MAINE.

ORE SEPARATOR AND AMALGAMATOR.

SPECIFICATION forming part of Letters Patent No. 287,195, dated October 23, 1883.

Application filed August 4, 1882. (No model.)

*To all whom it may concern:*

Be it known that we, HORACE P. TOBEY, of Wareham, in the county of Plymouth and State of Massachusetts, and GEORGE B. THAYER, of Boston, in the county of Suffolk and State of Massachusetts, have invented a new and Improved Ore Separator and Amalgamator, of which the following is a specification.

The concentrating-table which we have invented may be used, first, as a separator or concentrator; second, as an amalgamator; third, as a draining-table; fourth, as a separator and amalgamator combined; fifth, as a draining-table and amalgamator combined.

Our invention relates to that class of ore-separators, &c., having inclined reciprocating trays, whereon the separation is accomplished by means of the peculiar movements of such trays, combined with the action of graduated jets or currents of water flowing thereon. This process of concentration or separation is a delicate one and requires perfect machinery. It is desirable that in its forward longitudinal movement the reciprocating tray or table shall move with a constantly-increasing speed until it reaches the end of the forward stroke; that it shall reverse its motion instantly at high speed, and then move backward to the end of its downward stroke with constantly-diminishing speed, reversing slowly at this point. It is furthermore desirable that its movement shall be smooth, noiseless, and entirely free from lost, false, or double motions or jumps; that the times or periods of reciprocation, the ratio to each other of the highest and lowest speeds in each reciprocation, and the extent of travel for each reciprocation of the table shall be under the control of the operator and adjustable to the requirements of the ore under treatment, and that the supply of ore and water should in like manner be under control.

Our invention has for its objects, primarily, to give a more efficient, smooth, and noiseless movement to the tray or table than is obtainable by any of the devices heretofore invented, to render this movement adjustable to suit the requirements of different kinds and classes of ores, and to secure a more uniform supply of ore and water to the table; and, secondarily, to improve certain minor details of construction, with a view to reducing the weight of the moving parts, and consequently their wear and the power required to operate the machine.

Figure 2:
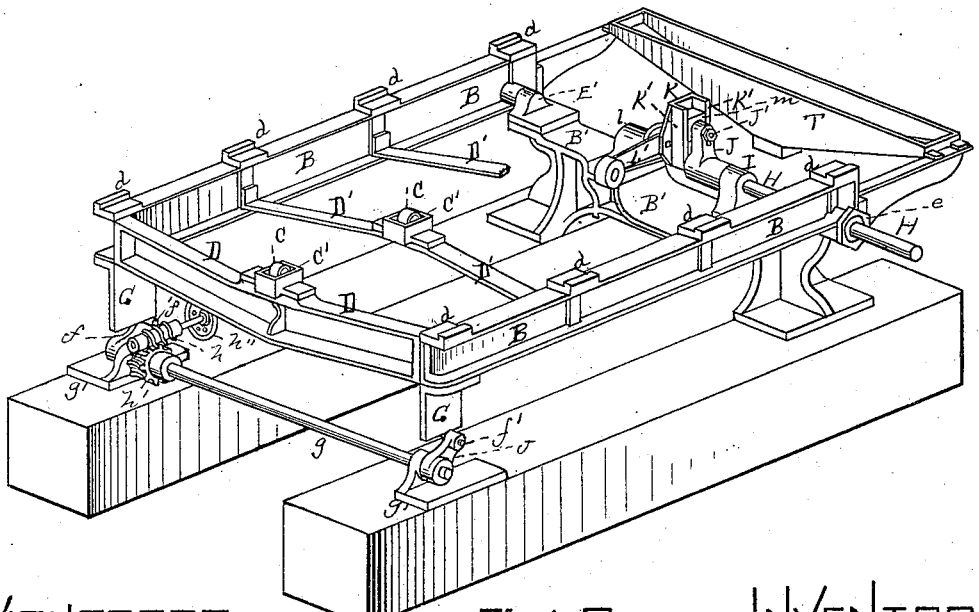
Figure 3:
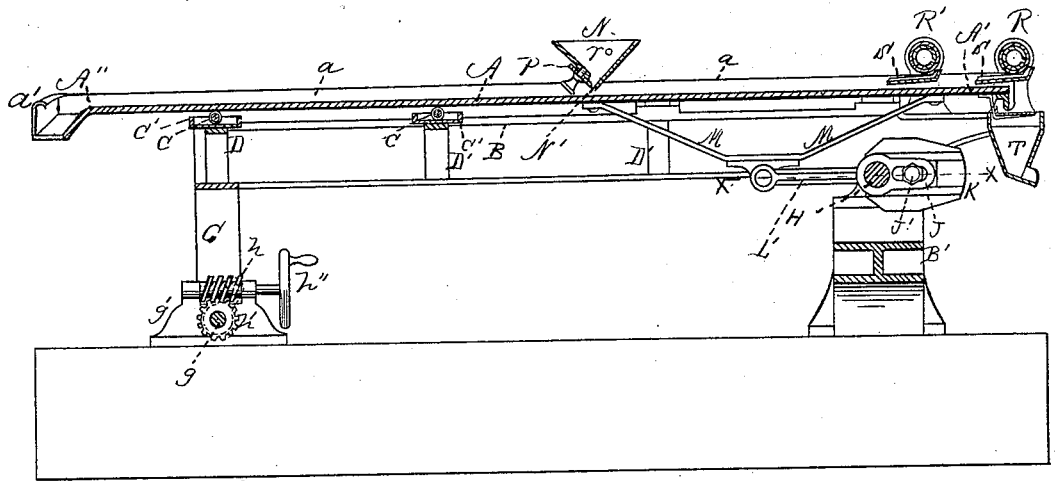
Figure 5:
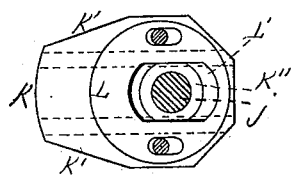
Figure 4:
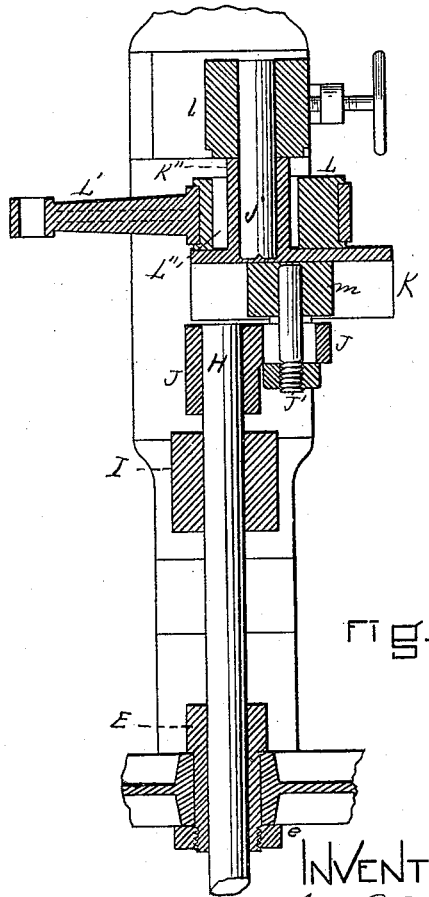
Figure 6:
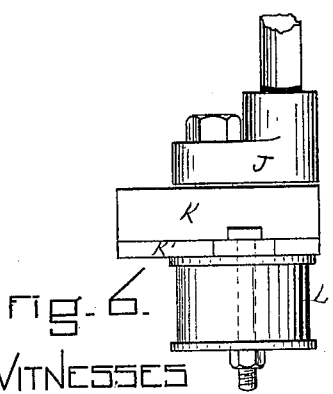

In the accompanying drawings, in which the same letters of reference indicate the same or corresponding parts, Figure 1 is a perspective view, showing the separator or concentrator complete. Fig. 2 is a similar view with the reciprocating tray or table, distributing-trough, and water-pipes removed. Fig. 3 is a longitudinal vertical central section of the separator. Fig. 4 is a horizontal section on line $x \, x$, Fig. 3. Fig. 5 is a side elevation of the lever K. Fig. 6 is a plan or top view of the same. Fig. 7 is a detail view, in section, of a portion of one of the pipes. Fig. 8 is a cross-section of the same. Fig. 9 is a view of the supply end of one of the water-pipes. Fig. 10 is an enlarged end elevation of the distributing-trough and adjacent parts. Fig. 11 is a view, partly in elevation and partly in section, of said trough, the trunnion E, &c. Fig. 12 is an enlarged sectional view of the heading-trough, showing the copper plate in position for the recovery of the mercury, as below described.

A represents the reciprocating tray or table, which consists of a bed or bottom piece, of wood, rubber, leather, or other material, having on the two side edges upright sides $a$, projecting somewhat above its upper surface, to prevent the lateral escape of the ore and water. The "head" or highest end of the table, where the mineral is discharged, is at A'; the "foot" or lower end of the table, where the water and "gangue" are discharged, is at A''. When the table or tray A is used as a "draining-table," or as a draining-table and "amalgamator" combined, the lower or water discharge end, A'', has a dam, to guard against the escape of the pulp in this direction. This dam is not novel, and does not appear in the drawings. When the table is used for any of the other purposes mentioned, we prefer to leave both ends thereof open, as shown in the drawings, and either one or both may have a collecting-apron, $a'$, constructed as usual, and shown in Figs. 1 and 3. The upper surface of the tray A is, when necessary, provided with a covering, A''', (see Figs. 8, 9, 11,) of suitable material, to protect its bed from the action of the water. When used for an amalgamator, this covering A''' should be the ordinary one, of sheet-copper, either plain or silver-plated, mercury-coated in the usual way. When the table is used for any of the other purposes mentioned, a covering of rubber (not new in this invention) forms an excellent surface, and affords entire protection to the bed of the tray.

Firmly attached to the table A, and for the purpose of supporting it, are on either side bearing-plates $b$ $b$, which, as the tray is reciprocated, slide upon the lugs $d$ $d$, cast upon or secured to the supporting-frame B. As commonly constructed these trays are supported at only two points on each side, which necessitates making them extremely heavy, in order to secure the requisite stiffness. In our improvement we multiply the points of support, and are thus enabled to reduce the weight of the tray (which is the principal moving part) to a considerable extent, thereby proportionally reducing the power required to run the machine, as well as the wear of the parts; and, furthermore, in all cases where, from its width, the tray would require additional transverse supports between the side supports $b$, the position of which would render a sliding support objectionable from the difficulty of lubrication, we provide, as additional supports for the tray, one or more longitudinal series of free rollers, C, preferably hollow, each roller being free to partake of the longitudinal movement of the tray A by rolling upon a smooth surface formed upon the cross-girts D D', and being guided and limited in its motion by the cage or frame C', or equivalent mechanical device formed or fixed upon said cross-girts, or, if desired, upon the bottom of the tray. It is obvious that we may use the free rollers C, with their cages, in place of any or all of the sliding supports $b$ at the sides of the table. All the bearing-surfaces which sustain the weight of the table or tray are formed upon or attached to a stiff unyielding supporting-frame, which consists of the two longitudinal side frames, B, firmly tied together at the lower end of the machine by the foot-girt D, and by the additional girts D', if desired, and at the upper end by the trunnions E E', with their ring-nuts $e$ $e$, said trunnions being firmly bolted or formed upon the main girt or bed-piece B'.

To enable us to give the tray or table A the varying pitch or inclination proper for working different kinds of ores, &c., an elevating mechanism is attached to the supporting-frame above described at or near the lower end of the machine. This consists, essentially, of two legs or bearing-lugs, G G, formed or abutted upon the side frames, B, or upon the foot-girt D, which lugs rest upon wrist-pins $f'$ of the cranks $f$, fixed upon the shaft $g$, which shaft is rotated in its bearings in the standards $g'$ $g'$ to elevate or lower the rear end of the supporting-frame by means of the worm $h$ and worm-gear $h'$, the supporting-frame turning upon the trunnions E E' as its pivotal center, thus changing the inclination of the table A, which rests thereon. Hand-wheel $h''$ is the means for turning the gear.

As our devices for giving to the tray A its peculiar movements form a principal feature in our invention, and as these devices are capable of being applied in various ways to perform their offices, we will first describe them in a general way, and afterward explain their special application to that form of the machine which we have selected for full illustration in the drawings as offering certain obvious advantages as to simplicity, smoothness of action while running, ease of construction and adjustment for securing any desirable variation in the ratios of the speed of the table for different parts of the stroke or variation in the extent of travel of the table, and as embodying all the other essential features of our invention, premising, however, that we do not limit the application of our invention to trays supported or constructed in the manner herein described, as the tray may be supported upon springs, rocker-arms, &c., or suspended by chains, rods, cords, &c., or by any other means which will permit it to have the peculiar motion hereinafter to be described; or the tray may be of any of the forms used in machines of this class—as a belt, for example, running upon rollers—to which is communicated the peculiar motion referred to in addition to its motion upon the rollers; also, premising that we do not limit ourselves to the application of our devices in this exact form and arrangement.

In the form of our device illustrated by the drawings we have selected as the shifting-point of the lever that point to which the power is applied. As represented in the drawings, the machine is supposed to be driven from a counter-shaft, which may be located with reference to the machine in any convenient position, either overhead or beneath, or at either end of the machine. The speed of this counter-shaft should be capable of being varied to suit the requirements of the ore under treatment, and we propose to accomplish this by the interposition between the counter-shaft and the main shaft or source of power of cone-pulleys or their equivalents. From this counter-shaft power is communicated to the driving-shaft H, with its fly-wheel H', through the tight and loose pulleys $i$ $i'$, in the usual manner; and we prefer to make the axis of the shaft H to coincide with a straight line drawn through the axes of the trunnions E E'. The outer bearing of the driving-shaft H is in the trunnion E, and the bearing for the inner end is in the supporting-standard I, which is firmly bolted to the bed-piece B'. The shaft H extends nearly to the median line of the machine, and has fixed upon its inner end the crank J with its wrist-pin J'. The wrist-pin J' may be fixed upon said crank; or it may be adjustably secured thereto as a means of varying the ratio of the highest and lowest speeds of the table during the stroke. Beyond the inner end of the shaft H the lever K revolves upon the stud or pin $j$, which is fixed upon the supporting block or carriage $l$. From the face of the lever K, on the side toward shaft H, project two parallel flanges, K', forming between them a rectangular groove, in which slides a box, $m$, having a hole formed therein, into which the wrist-pin J' enters. The axis of the pin $j$ should not be on a line with but parallel to the axis of the shaft H, and should be fixed somewhere between this line and the circular path described by the crank-pin, in order to give a rotative motion to the lever. In case the axis of the pin $j$ falls outside the circular path described by the wrist-pin J', the motion of the lever is one of oscillation simply, (part of a complete rotation on its axis.) Consequently the pin $j$ may be so adjusted as to give either motion, and either motion will give an effective movement to the tray; but we prefer the rotative motion. Our figures illustrate only the case of a rotating lever. The wrist-pin J' in its revolution about the shaft H carries with it the sliding box $m$, which accommodates itself to its enforced connection with said wrist-pin by sliding backward and forward in the groove of the lever K from and toward the axis of rotation of said lever, and thus applies to said lever at constantly-shifting points the power which it receives from the steadily-rotating shaft H. The resultant motion of the lever K is one of rotation around the stud or pin $j$ as its axis, and its absolute speed of rotation, corresponding to different positions of the wrist-pin J', varies directly as the cosine of the angle made by two lines drawn from the axis of the wrist-pin J' to the axis of rotation of the shaft H, and to the axis of the pin or stud $j$, and inversely as the distance of the axis of the crank-pin J' from that of the stud $j$. To convert the rotary motion of the lever K into the reciprocating motion of the tray A, we attach to the lever K, outside its supporting-hub K'', the eccentric hub L, having the usual form of connecting-rod, L', attached either directly to the table A or to an intermediate arm, M, fixed to the tray. The supporting-hub K'' of the lever K passes through a slot, L'', in the eccentric hub L, which permits us, by moving horizontally the center of the eccentric hub L toward or from the center of the hub K'', thus varying the eccentricity of the hub L, to regulate the extent of travel of the tray.

The different parts of the mechanism just described for communicating motion to the tray should be so connected together that the highest speed of the lever K may occur at the moment when the tray A arrives at the end of its forward stroke and the slowest speed may occur at the end of the backward stroke, so that on the sudden reversal of the direction of movement of the tray at the end of the forward stroke the momentum of the mass of ore thereon gradually acquired during the upward movement may cause the ore to travel upward upon the tray, while the more gradual reversal of motion of the tray at the end of the backward stroke may give the ore a chance to settle upon the bed of the tray, preparatory to the next upward movement. In separating dissimilar ores it is desirable not only to be able to vary the extent of travel of the table, as before explained, but also to vary the speed of the lever at the end both of the forward and backward strokes of the tray. For this reason we make the carriage $l$ so that by adjusting its position upon the girt or bed-piece B' we may cause the pin or stud $j$ to approach to or recede from the axial line of the shaft H. The nearer the stud $j$ approaches the circular path described by the crank-pin J' the more rapid will be the reversal of the tray at the end of the forward stroke. By these adjustments for regulating both the extent of travel of the table and its speed of reversal at the end of the strokes, we have the movements of the tray under perfect control, and are enabled to treat the most dissimilar ores with entire success.

From the foregoing it will be sufficiently obvious, without further explanation, that if we select as the shifting-point of the lever K either its fulcrum or that part of said lever from which the power is transmitted to the tray, the operation of the lever and movements of the tray will be in all essential respects the same as in the case above described, in which we have selected as the shifting-point that part of the lever to which the power is applied.

In order to obtain the best results from the table while in operation, both as to the quantity and the quality of the work done, it is essential that the delivery of the ore to the table—which takes place along a straight line running transversely across the table—should be uniform both as to the rate of delivery and the amount supplied to each part of the table. The amount of ore supplied should be under the control of the attendant, and the delivering apparatus should discharge the ore or "pulp" as near the surface of the table as possible, so as not by the violence of its fall to seriously interfere with the process of separation going on along the line of delivery. Our means of fulfilling the above conditions consist in a delivery or distributing trough, N, extending transversely nearly across the table, having along its bottom edge (which is brought as near the surface of the tray as possible) a longitudinal slit, N', or a series of separate openings discharging in a straight line across the width of the table, either directly upon the table itself or into a narrow tray fastened to the tray A, and partaking of its motion. The delivery-trough may be attached to and partake of the motion of the tray A; but to avoid putting so much additional moving weight as this would involve upon the tray we prefer to pivot and support it upon the standards $o$, attached to the side frames, B. In order to assure the uniform delivery of the pulp, a gate, P, capable of adjustment, (or a series of gates capable of independent adjustment,) regulates the width of the discharge-opening N', and in order to prevent the formation of water ways or channels in the body of the ore we attach to each side of the delivery-trough an arm, n, extending downward, so as to be struck by the studs n', fastened to the sides of the tray. By this means the body of pulp contained in the delivery-trough is kept at all times in a closely-compacted state. The efficient agent in causing the discharge of the pulp from the delivery-trough N is the head of water contained therein, and to render this head of water uniform we put a waste-water overflow, r, near the upper edge of the delivery-trough, to discharge the surplus water over the side or lower end of the table into the waste-water sluice. The pulp or comminuted ore being fed upon the table A in the manner described while the tray is in motion, the tendency of the peculiar variable motion of the tray is to cause all the particles of the pulp—the lighter as well as the heavier—to travel upward toward the head A' of the tray, the heavier mineral particles of course tending to range themselves so as to form the lower stratum, while the lighter particles or gangue tend to range themselves above the mineral particles, according to their specific gravities. The separation of the mineral from the gangue in all separators of this class is effected by allowing a current of water to flow over the stratum of pulp spread over the surface of the tray, which current carries down with it the lighter particles of gangue, but, being properly graduated in quantity according to the ore under treatment and the pitch or inclination of the table or tray, allows the mineral particles from their greater specific gravity to ascend the slope of the tray against the current of water.

Hitherto it has been usual to supply water to the tray from several distinct outlets arranged in a single line across the upper end of the tray. We prefer, however, to apply the water to effect the separation of the gangue from the mineral particles of the pulp or comminuted ore in a continuous thin sheet transversely upon the surface of the tray from side to side, either along a single line near the head of the tray or along two or more lines, one in advance of the other, and we prefer to have this discharge of water take place under a considerable head, in order that the impulse of the water, due to the head in the delivery pipe or pipes, may be utilized to increase the efficiency of the action of the water upon the pulp, and consequently the rapidity of the separation. We propose to deliver the water in the manner above described by means of a water pipe or pipes of any convenient form of cross-section extending horizontally across the tray in a line transverse to its direction of travel, and having horizontally made therein a continuous slot adjustable as to width. The discharge from the slot may be made directly upon the tray; but we prefer, as a means of regulating the direction and force of the jet, to use in connection with each of the water-pipes R R' the deflecting-apron S, capable of adjustment both as to its height above the surface of the tray and its angle of inclination thereto. The water, being discharged from the slot t of the pipe R upon the deflecting-apron S with considerable velocity, spreads out into a uniform sheet thereon, and is discharged from its lower edge against the ascending pulp, driving back the lighter portions; but, being properly regulated both in amount and direction, it will allow the mineral particles of the pulp to pass upward under the apron, so as to be discharged at the head of the tray into the receptacle T, provided for them. Instead of the continuous slot t, a series of slots, openings, or nozzles may be used in connection with the deflecting-apron to produce a thin continuous sheet of water, if desired. When the water-discharge takes place along a single line of separate outlets in the usual manner, the whole body of the ascending gangue must be driven back along this line, requiring a very nice adjustment of the water-jets, in order to do good work. Our system of multiple water-pipes does not necessitate such a nice adjustment, as a partial separation takes place at the lowest water-pipe, and any gangue which may pass this pipe will be driven back by the next succeeding ones, enabling us to do perfect work without any very nice adjustment of the water-supply; and, furthermore, the common system of a longitudinal series of distinct jets of water requires, in order to bring the action of the water-jets upon all parts of the surface whereon the separation takes place, either such surface or the water-pipe itself to have a reciprocating motion transverse to the direction of the incline, the necessity for which is obviated by our method of discharging the water in a continuous sheet across the tray. The direction of the water-jet being thus controlled by means of the apron S, it remains to provide means for regulating the amount of water to be discharged. For this purpose we construct the water-supply pipe or pipes as shown in Figs. 7, 8, 9, in which R shows an outer pipe having the longitudinal slot t, and accurately fitting the interior of said pipe is a second pipe, divided longitudinally into two parts. The part U is fixed within the inclosing-pipe in such manner that its beveled edge U'', which forms one of the lips of discharge, shall be somewhat below the middle line of slot t of the outer pipe, R. The part U' of the inner pipe, which has a beveled edge at U''', is free to move circumferentially within the outer pipe, so as to regulate the width of the opening between the beveled lips of discharge U'' and U''''. This is accomplished by means of the lever V, attached to the spindle V', said spindle being fixed to the part U' and passing through the usual stuffing-gland, V'', in the outer cap, W, which closes the end of the outer pipe, R. The water-supply is controlled by the shut-off valve W'.

The water-pipe R, as well as the deflecting-apron S, may be attached to and move with the tray, and the apron S may also be attached to the pipe R, and both be stationary. We prefer, however, the arrangement shown in the drawings, wherein the apron alone moves to and fro with the table, the water-pipes passing through holes in the standards Y, and being adjustably secured thereto by means of set-screws, which permit of varying the direction of the jet of water with reference to the apron, and thereby enable us to regulate the velocity of the water as it is discharged from the apron upon the pulp.

We do not limit the use of our peculiar form of water-vessel above described to the particular form of ore bed or tray shown by our drawings, since both are equally applicable to ore beds or trays constructed, mounted, and moved in any manner whereby the stratum of ore is carried up the inclined surface of such ore bed or tray under the water-vessel and subjected to the washing action of the water issuing from such vessel; nor do we limit the use of our system of multiple water-pipes to water-vessels which discharge their water in a continuous sheet, since it is equally applicable to water-vessels which discharge their water in the form of jets, spray, &c.

In working free gold-bearing ores it is usual to use mercury for amalgamating either in the batteries or on the apron leading therefrom, and the excess of mercury is mingled with the pulp, and during the subsequent process of separation of the base mineral from the gangue passes over the head of the table along with the particles of minerals or "headings," so-called. It is desirable to separate this mercury from the headings, as otherwise, during the process of refining, it would go to waste. For this purpose we attach to the under side of the tray the shallow copper dish or pan Z, extending across the table in such manner that the headings may fall upon it and be compelled to travel over its surface before dropping into the heading-trough T. The surface of this pan Z is kept bright and clean by the application thereto of cyanide of potassium or other suitable chemical reagents, and the particles of mercury, on passing over this prepared surface, will amalgamate therewith, and, by heating the copper pan Z in a suitable retort, the mercury is expelled and saved and the dish or pan used again. If desired, this pan may be secured to the frame, instead of the tray, in which case its inclination must be sufficient to cause the ore dropping thereupon to pass over its surface by the action of gravity.

We are aware that water-vessels for discharging water upon the tray of separators have been perforated; but such we do not claim as our invention.

Having thus fully described our invention, what we claim, and desire to secure by Letters Patent, is—

1. In an ore-separator, the combination, with a reciprocating ore bed or tray, of the transversely-placed water-discharging vessel R, provided with a continuous slot therein, and adapted to maintain a continuous sheet of water from a sufficient head across the entire width of the tray, substantially as and for the purpose set forth.

2. In combination with the external tube, R, provided with the longitudinal slot $t$, the closely-fitting internal tube, U U', the portion U being immovably secured to the tube R and provided with the lip U'', the portion U' being provided with the lip U''', spindle V', and lever V, all constructed to operate substantially as and for the purpose described.

3. In an ore-separator, an upwardly-inclined reciprocating ore-bed, in combination with a water-vessel adapted to discharge continuous sheets of water along several transverse lines arranged in successive order, whereby the mineral is successively treated with the several lines of water during its passage to the upper end of the ore bed or tray, substantially as set forth.

4. In combination with the reciprocating tray A, provided with the stud $n'$, the distributing-trough N, provided with the arm $n$, the standards $o$, and the frame B, whereby motion is imparted to said trough, substantially as and for the purpose described.

5. The combination, with the tray A, of the copper pan or plate Z, connected thereto and arranged to receive the headings from the tray A, for the purpose of saving the mercury contained therein, and means for imparting reciprocation to the tray and plate, as set forth.

6. The combination of the reciprocating tray A, its supporting-frame B D D', pivoted upon trunnions, the trunnions E E', the worm-gear $h'$, worm $h$, shaft $g$, standards $g'\ g'$, cranks $f$, and wrist-pins $f'$, which constitute an elevating apparatus, by means of which the foot or lower end of the supporting-frame is rapidly elevated or lowered by the application of power at a single point.

7. In combination with the tray A and a supporting-frame, the lever K, having two arms, and means for connecting one arm with the tray and the other arm with a steady or uniform power, in substantially the manner described, whereby the ratio of the lengths of the two arms of the lever to each other shall be constantly changing during the forward and backward strokes of said tray, for the purpose of communicating to said tray the peculiar accelerated and retarded reciprocating motion above described.

8. The combination, with the tray, of the following parts, viz: the frame B B', shaft H, provided with the crank J and wrist-pin J', box $m$, lever K K', eccentric hub L, and rod L', connecting with said tray, substantially as and for the purpose set forth.

9. The combination, with the tray A and lever K, of the eccentric hub L and adjustable connecting-rod L', substantially as and for the purpose described.

10. In an ore-separator, the combination of the following parts, viz: the tray, the shaft H, crank J, wrist-pin J', lever K, suitably connected with the tray, stud $j$, and adjustable carriage $l$, arranged as described, and for the purpose set forth.

11. The combination of the main driving-shaft, a reciprocating ore bed or tray, A, the supporting-frame B D D', pivoted at one end around the axis of the main driving-shaft of the machine, and suitable elevating mechanism applied at or near the other end of said frame, for the purpose of regulating the inclination of said tray.

12. In an ore concentrating or separating machine, in combination with an inclined reciprocating ore bed or tray, A, the adjustable eccentric hub L, and adjustable connections interposed between the tray and the source of power, for the purpose of regulating the travel of said tray.

HORACE P. TOBEY.
GEORGE B. THAYER.

Witnesses:
HENRY W. WILLIAMS,
LUKE HILLARD.